United States Patent [19]

Brandt

[11] 4,370,617
[45] Jan. 25, 1983

[54] SYNCHRONIZATION EXTRACTOR RESPONSIVE TO DIGITAL SIGNALS

[75] Inventor: Dieter Brandt, St. Johann, Fed. Rep. of Germany

[73] Assignee: Wandel & Goltermann GmbH & Co., Muhleweg, Fed. Rep. of Germany

[21] Appl. No.: 178,384

[22] Filed: Aug. 15, 1980

[30] Foreign Application Priority Data

Aug. 17, 1979 [DE] Fed. Rep. of Germany ....... 2933322

[51] Int. Cl.³ .......................... H03K 1/17; H03B 1/00
[52] U.S. Cl. ..................................... 328/63; 307/269; 307/273; 328/139; 328/72; 375/118
[58] Field of Search ................... 328/207, 139, 63, 72, 328/155; 307/269, 273, 234; 375/110, 175

[56] References Cited

U.S. PATENT DOCUMENTS 3,713,145  1/1973  Butler et al. ........................ 307/234
4,001,716  1/1977  Swanson et al. .................... 307/273
4,002,987  1/1977  Kuhn ................................. 328/207

*Primary Examiner*—Stanley D. Miller
*Assistant Examiner*—B. P. Davis
*Attorney, Agent, or Firm*—Karl F. Ross

[57] ABSTRACT

In order to extract from a digital signal a train of sync pulses faithfully reproducing any phase jitter to which that signal is subjected, a pulse generator with a cadence equal to the reciprocal of the mean bit period is interrupted and restarted by a pulse shaper such as a monoflop in response to each incoming "1" bit. The pulse generator may comprise a second monoflop, triggerable by the first monoflop and provided with a feedback loop including a third monoflop which is inhibited by the first one in the presence of a "1" bit, or a free-running oscillator working into a frequency divider in the form of a pulse counter which is reset by the pulse shaper while the latter inhibits the oscillator.

8 Claims, 4 Drawing Figures

SYNCHRONIZATION EXTRACTOR RESPONSIVE TO DIGITAL SIGNALS

FIELD OF THE INVENTION

My present invention relates to a circuit arrangement designed to extract a train of synchronization pulses from an incoming digital signal having a predetermined mean bit period, e.g. for the measurement of phase jitter or for insuring faithful decoding or regeneration of binery messages.

BACKGROUND OF THE INVENTION

Clock-pulse extractors conventionally used at receiving stations of PCM transmission systems comprise voltage-controlled oscillators whose output voltage is a pulse train fed back to a phase comparator, also receiving the incoming signal, which forms part of a phase-locking loop serving to suppress rapid phase excursions of that signal in the oscillator output. The phase comparator delivers a voltage proportional to phase differences between the generated pulse train and the digital signal, this voltage being delivered to a control input of the oscillator by way of a low-pass filter. Up to a certain limiting jitter frequency, which for clock-frequency stabilization should be as low as possible, the generated pulse train still follows the phase shifts of the signal. Thus, an imperfect phase-jitter suppressor of this type may conceivably be used in a sync-pulse extractor designed to preserve the original phase excursions, provided the limiting jitter frequency could be sufficiently raised for this purpose. Such a modification, however, would entail considerable circuital complications as higher jitter frequencies would require a larger loop amplification which is essentially supplied by the oscillator itself and which would have to take into account a variable transfer coefficient of the phase comparator; this coefficient is an approximately linear function of the number of incoming pulses of relatively high voltage (data bits of logical value "1") in a given number of bit periods and therefore depends on the instantaneous bit pattern so that a separate control circuit would be needed in order to keep the loop amplification constant. The design of a suitable phase comparator, responding only to data-word configurations which begin with such "one" bits, is also relatively complex.

OBJECT OF THE INVENTION

The object of my present invention, therefore, is to provide a relatively simple synchronization extractor which faithfully reproduces the phase jitter of an incoming digital signal while avoiding the problems referred to.

SUMMARY OF THE INVENTION

I realize this object, in accordance with the present invention, by providing a pulse shaper such as a monostable multivibrator (monoflop) connected to an input terminal for receiving the incoming digital signal and emitting a start pulse, of a duration less than the mean bit period of that signal, in response to a high-voltage pulse thereof which is also assumed to last less than such bit period and is usually considered to represent a logical "1". A pulse generator, with a cadence or repetition frequency substantially corresponding to the reciprocal of the mean bit period, is connected to the pulse shaper for inhibition by a leading edge and retriggering by a trailing edge of each start pulse, thereby emitting a train of sync pulses closely following any phase shift undergone by the incoming bits.

More particularly, the pulse generator may comprise a pair of cascaded monoflops one of which emits a sync pulse upon being triggered by the trailing edge either of a start pulse from the pulse shaper or of a feedback pulse coming from the other monoflop after the latter has been triggered by the trailing edge of a preceding sync pulse, this other monoflop having a blocking input connected to an output of the pulse shaper for inhibiting the emission of a feedback pulse in the presence of a start pulse.

Alternatively, the pulse generator may comprise a free-running oscillator with a disabling input connected to the pulse shaper for deactivation in the presence of a start pulse, this oscillator feeding a stepping input of a multistage pulse counter having a resetting input connected to its own final-stage output and to the pulse shaper; upon being thus reset, and after taking one further step, the counter generates a sync pulse on a first-stage output thereof whereby these sync pulses appear whenever the counter has reached its full count or when that count is foreshortened by the intervention of a new start pulse. For this purpose the oscillator must have an operating frequency equal to n times the reciprocal of the mean bit period, n being the number of counter stages.

BRIEF DESCRIPTION OF THE DRAWING

The above and other features of my invention will now be described in detail with reference to the accompanying drawing in which.

SPECIFIC DESCRIPTION

Figure 1:
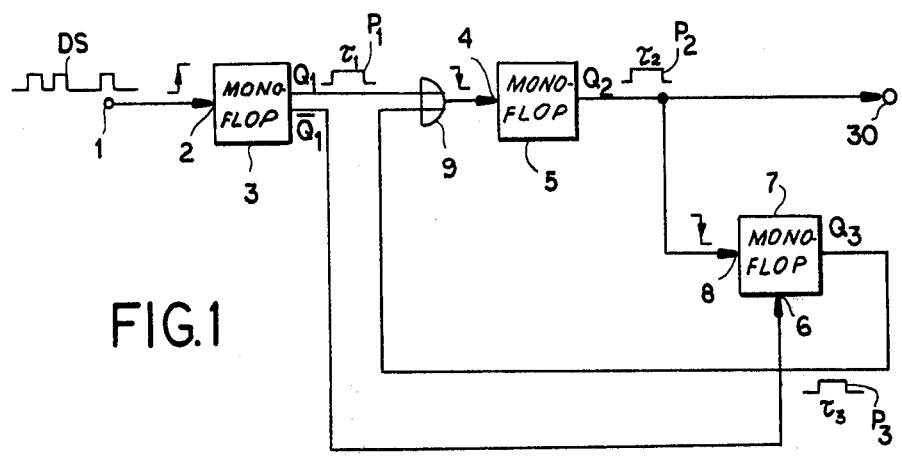
FIG. 1 is a block diagram of a synchronization extractor representing the first embodiment of my invention.

In FIG. 1 I have shown an input terminal 1 receiving an incoming digital signal DS subjected to a certain phase jitter. This signal is fed to a trigger input 2 of a first monoflop 3, serving as a pulse shaper, which responds to positive-going pulse flanks and thus to the leading edges of the high-voltage pulses of positive polarity representing logical-one data bits. During an off-normal period $\tau_1$ of monoflop 3, a start pulse $P_1$ appears on an output $Q_1$ thereof and passes by way of an OR gate 9 to a trigger input of a second monoflop 5 responsive to negative-going pulse flanks, i.e. to the trailing edge of that start pulse. A pulse $P_2$ emitted by monoflop 5 on an output $Q_2$ thereof during an off-normal period $\tau_2$ is transmitted as an extracted sync pulse to an output terminal 30 and is also fed to a trigger input 8 of a third monoflop 7 which, during an off-normal period $\tau_3$, generates a feedback pulse $P_3$ on an output $Q_3$ upon detecting the trailing edge of such sync pulse. In the presence of a start pulse $P_1$, however, monoflop 7 is inhibited by an inversion of that start pulse delivered to a blocking input 6 thereof from another output $\overline{Q_1}$ of monoflop 3; input 6 could also be considered an enabling connection energized in the inactive state of monoflop 3 via its inverting output $\overline{Q_1}$. Feedback pulse $P_3$ is transmitted to the trigger input 4 of monoflop 5 via OR gate 9. Once started by a trigger pulse $P_1$, monoflops 5 and 7 operate as a free-running oscillator until stopped by an inhibiting signal on input 6.

Figure 2:
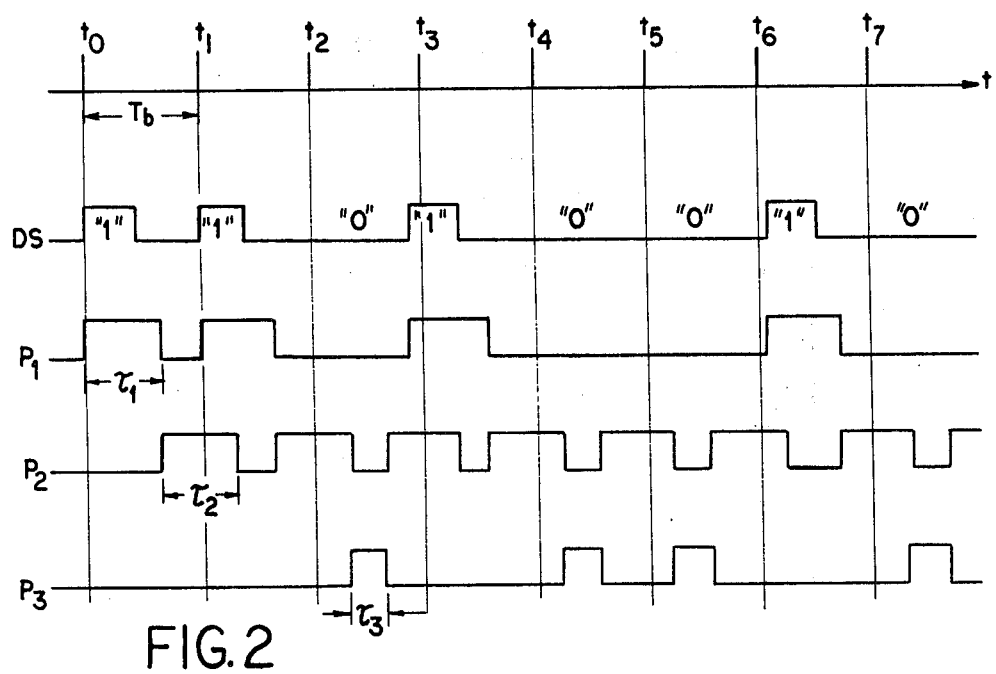
FIG. 2 is a set of graphs relating to the operation of the embodiment of FIG. 1.

The incoming digital signal DS has a predetermined mean bit period $T_b$ indicated in the top graph of FIG. 2. The signal DS itself, illustrated in the second graph, has high-voltage pulses of a width substantially equal to $T_b/2$ which occur in those bit periods in which the logical value of the signal is "1", here specifically in periods $t_0$–$t_1$, $t_1$–$t_2$, $t_3$–$t_4$ and $t_6$–$t_7$. Owing to phase jitter experienced during transmission, however, the third high-voltage pulse begins slightly before instant $t_3$ whereas the fourth such pulse arrives somewhat after instant $t_6$. Start pulses $P_1$ and sync pulses $P_2$, shown in the next two graphs, have identical widths equal to $2T_b/3$ given by off-normal periods $\tau_1$ and $\tau_2$ which are mutually identical and double the period $\tau_3$ whereby feedback pulses $P_3$ (bottom graph) have a duration equal to $T_b/3$. Thus, the combined width of pulses $P_2$ and $P_3$ equals the bit period $T_b$.

Feedback pulses $P_3$ are generated only during those bit periods in which the signal DS has the logical value "0", i.e. after instants $t_2$, $t_4$, $t_5$ and $t_7$ in the present example. It is only during these bit periods that the oscillator constituted by monoflops 5 and 7 runs freely; at all other times it is restarted by pulses $P_1$ in phase with respective high-voltage signal pulses.

Figure 3:
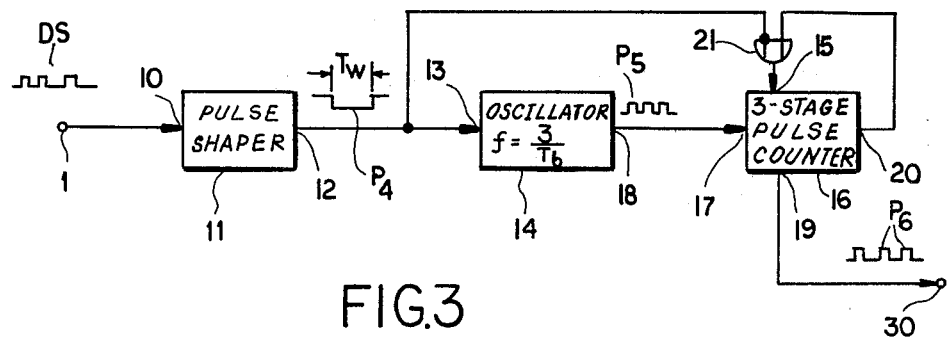
FIG. 3 is a block diagram representing a second embodiment.

In the embodiment of FIG. 3 the terminal 1 carrying the incoming signal DS is tied to an input 10 of a pulse shaper 11 which may again be a monoflop and produces a negative-going start pulse $P_4$ on an output 12 thereof in response to the leading edge of any high-voltage signal pulse. Pulse $P_4$ reaches a disabling input 13 of a normally free-running oscillator 14 generating a train of pulses $P_5$ on an output 18 which is connected to a stepping input 17 of a 3-stage pulse counter 16 acting as a digital frequency divider. Counter 16 has a final-stage output 20 connected to a resetting input 15 thereof via an OR gate 21 which also has an inverting input connected to output 12 of pulse shaper 11 for receiving the start pulses $P_4$. Thus, counter 16 returns to zero after taking three consecutive steps or, earlier, in response to a start pulse. The duration $T_w$ of this start pulse $P_4$ is equal to $T_b/2$ as seen in the third graph of FIG. 4; in this instance, as will be apparent from the two top graphs, the high-voltage pulses "1" of signal DS are slightly shorter than half a bit period but the chosen data-bit pattern between instants $t_0$ and $t_7$ (see the two top graphs) is the same as in FIG. 2.

Figure 4:
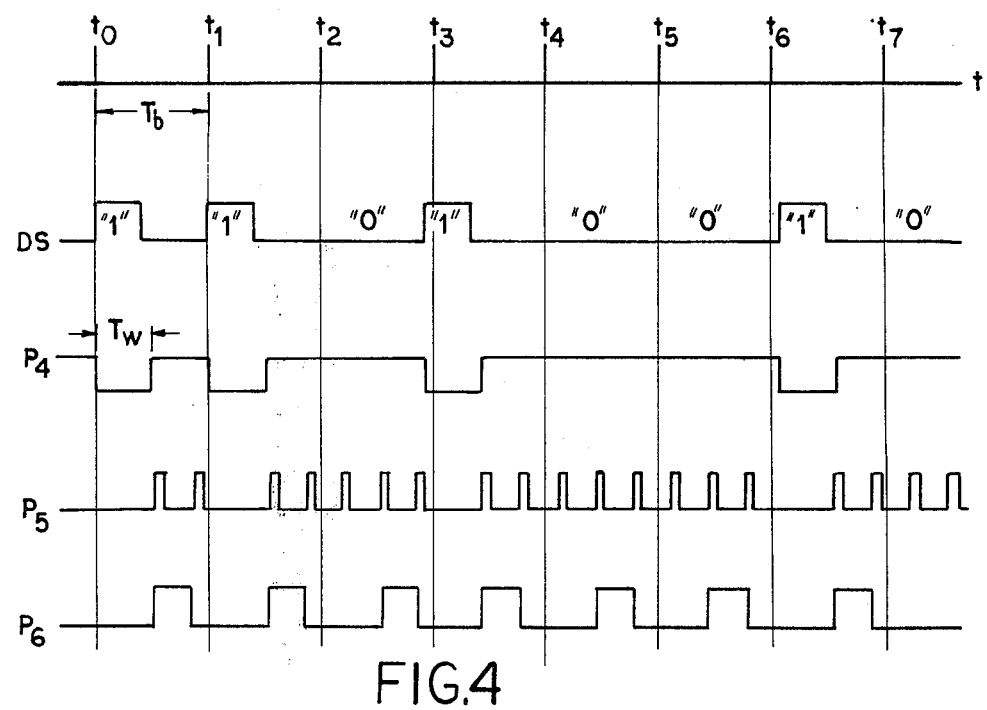
FIG. 4 is a set of graphs relating to the operation of the embodiment of FIG. 3.

Oscillator 14 has an operating frequency or pulse cadence $f = 3/T_b$ corresponding to three pulses $P_5$ per bit period $T_b$ except when its output is interrupted by a pulse $P_4$ on its disabling input 13, as illustrated in the fourth graph of FIG. 4. Upon taking one step after being reset by the leading edge of such a start pulse, or by every third stepping pulse $P_5$ in the event of continuous operation of the oscillator, counter 16 emits on a first-stage output 19 thereof a sync pulse $P_6$ illustrated in the bottom graph of FIG. 4. These pulses $P_6$, like the pulses $P_2$ of FIG. 2, are delivered to an output terminal 30 and come into existence in the second half of each bit period; unlike pulses $P_2$, however, pulses $P_6$ last for only a third of a bit period in accordance with the dividing ratio of counter 16. Oscillator 14 is so designed that a stepping pulse $P_5$ is generated immediately upon its enablement by the termination of a pulse $P_4$, thereby advancing the counter from its No. 0 position to its No. 1 position in which stage output 19 is energized until the next-following pulse $P_5$ establishes the No. 2 position unless the counter is reset earlier by a premature start pulse. The choice of $n = 3$ for the number of counting stages ensures correct operation even when a "1" data bit leads or lags its projected time position by a significant fraction of the mean bit period; the same applies to the specific pulse widths described with reference to the embodiment of FIG. 1.

With an all-1 bit sequence the output pulses of my improved synchronization extractor are precisely in step with the signal pulses, yet even a large number of consecutive 0's will not prevent instant resynchronization upon the occurrence of the next "1" bit. Instant synchronization is also obtained at the beginning of signal transmission, i.e. as soon as the first "1" bit appears. The mode of operation of the extractor is independent of jitter frequency and requires only a reasonably undistorted pulse shape of the incoming digital signal.

I claim:

1. A synchronization extractor responsive to an incoming digital signal subject to phase jitter appearing on an input terminal thereof and including high-voltage pulses which last less than a predetermined mean bit period, comprising:

pulse-shaping means connected to said input terminal for receiving said incoming signal and emitting a start pulse of a duration less than said mean bit period in response to a high-voltage pulse of said signal; and pulse-generating means with a pulse-repetition frequency substantially corresponding to the reciprocal of said means bit period, said pulse-generating means being connected to said pulse-shaping means for instant inhibition by a leading edge and instant retriggering by a trailing edge of each start pulse, thereby emitting a train of sync pulses recurring substantially at said mean bit period while closely following minor phase shifts undergone by the bits of said incoming signal.

2. A synchronization extractor as defined in claim 1 wherein said pulse-generating means comprises a pair of cascaded monoflops, one of said monoflops being alternatively triggerable by said trailing edge of a start pulse and by a trailing edge of a feedback pulse which is emitted by the other of said monoflops in response to a trailing edge of a sync pulse emitted by said one of said monoflops, said other of said monoflops having a blocking input connected to said pulse-shaping means for inhibiting the emission of a feedback pulse in the presence of a start pulse.

3. A synchronization extractor as defined in claim 2 wherein said monoflops have off-normal periods with a combined length substantially equal to said mean bit period.

4. A synchronization extractor as defined in claim 3 wherein the off-normal period of said one of said monoflops is substantially twice the off-normal period of said other of said monoflops.

5. A synchronization extractor as defined in claim 3 or 4 wherein the off-normal period of said one of said monoflops substantially equals the duration of said start pulse.

6. A synchronization extractor as defined in claim 1 wherein said pulse-generating means comprises a free-running oscillator with a disabling input connected to said pulse-shaping means for deactivation in the presence of a start pulse, and a multistage pulse counter with a stepping input connected to said oscillator and with a resetting input connected to said pulse-shaping means and to a final-stage output of said counter, said sync pulses appearing on a first-stage output of said counter energized upon a resetting and further stepping thereof, said oscillator having an operating frequency equal to n times the reciprocal of said mean bit period where n is the number of stages of said counter.

7. A synchronization extractor as defined in claim 6 wherein n=3.

8. A synchronization extractor as defined in claim 6 or 7 wherein the duration of said start pulse is substantially half said mean bit period.

* * * * *